US008532306B2

(12) United States Patent
Oh et al.

(10) Patent No.: US 8,532,306 B2
(45) **Date of Patent: *Sep. 10, 2013**

(54) METHOD AND AN APPARATUS OF DECODING AN AUDIO SIGNAL

(75) Inventors: Hyon-O Oh, Seoul (KR); Myung Hoon Lee, Seoul (KR); Yang Won Jung, Seoul (KR); Chirsluf Faller, Chavannes-pres-Renens (CH)

(73) Assignee: LG Electronics Inc., Seoul (KR)

( * ) Notice: Subject to any disclaimer, the term of this patent is extended or adjusted under 35 U.S.C. 154(b) by 312 days.

This patent is subject to a terminal disclaimer.

(21) Appl. No.: 12/676,848

(22) PCT Filed: Sep. 8, 2008

(86) PCT No.: PCT/KR2008/005291

§ 371 (c)(1), (2), (4) Date: Jun. 1, 2010

(87) PCT Pub. No.: WO2009/031870

PCT Pub. Date: Mar. 12, 2009

(65) Prior Publication Data

US 2010/0241438 A1 Sep. 23, 2010

Related U.S. Application Data

(60) Provisional application No. 60/970,524, filed on Sep. 6, 2007, provisional application No. 60/984,713, filed on Nov. 1, 2007, provisional application No. 61/078,761, filed on Jul. 7, 2008.

(51) Int. Cl.
*H04R 5/00* (2006.01)
*H04B 3/20* (2006.01)
*G06F 17/00* (2006.01)

(52) U.S. Cl.
USPC .................. 381/22; 381/18; 381/23; 381/66; 700/94

(58) Field of Classification Search
USPC ......... 381/23, 22, 17–18, 57, 63, 66; 700/94; 704/500–502
See application file for complete search history.

(56) References Cited

U.S. PATENT DOCUMENTS 3,783,192 A * 1/1974 Takahashi ........................ 381/22
4,251,688 A * 2/1981 Furner ............................ 381/18

(Continued)

FOREIGN PATENT DOCUMENTS

AU 2007328614 A1 6/2008
AU 2008295723 B2 3/2009

(Continued)

OTHER PUBLICATIONS

Faller, "Parametric Joint-Coding of Audio Sources", Audio Engineering Society 120th Convention, vol. 2, pp. 1-12, May 20, 2006.

(Continued)

*Primary Examiner* — Vivian Chin
*Assistant Examiner* — Douglas Suthers
(74) *Attorney, Agent, or Firm* — Birch, Stewart, Kolasch & Birch, LLP

(57) ABSTRACT

A method of decoding an audio signal is disclosed, The present invention includes the steps of receiving the audio signal having a plurality of channel signals including an ambient component signal and a source component signal, extracting the ambient component signal and the source component signal of each of the channels based on correlation between the channel signals, modifying the ambient component signal using surround effect information, and generating the audio signal including a plurality of channels using the modified ambient component signal and the source component signal. Accordingly, in an apparatus for decoding an audio signal and method thereof according to the present invention, an ambient component signal is extracted and modified based on correlation and the modified ambient and source component signals are outputted using different signal output units, respectively. Therefore, the present invention enhances a stereo effect of the audio signal. And, a signal output unit for outputting a ambient component signal is arranged to have an output direction different from that of another signal output unit for outputting a source component signal, whereby a listener can be provided with an audio signal of which ambient sound is enhanced.

11 Claims, 16 Drawing Sheets

(56) References Cited

U.S. PATENT DOCUMENTS

| | | | | |
|---|---|---|---|---|
| 6,026,168 | A | 2/2000 | Li et al. | |
| 6,496,584 | B2 | 12/2002 | Irwan et al. | |
| 6,952,677 | B1 | 10/2005 | Absar et al. | |
| 7,103,187 | B1 | 9/2006 | Neuman | |
| 8,046,217 | B2 | 10/2011 | Miyasaka et al. | |
| 8,082,050 | B2 | 12/2011 | Schmidt et al. | |
| 2001/0055398 | A1 | 12/2001 | Patchet et al. | |
| 2002/0136414 | A1* | 9/2002 | Jordan et al. | 381/58 |
| 2003/0026441 | A1 | 2/2003 | Faller | |
| 2005/0078831 | A1 | 4/2005 | Irwan et al. | |
| 2005/0089181 | A1 | 4/2005 | Polk, Jr. | |
| 2005/0271215 | A1 | 12/2005 | Kulkarni | |
| 2006/0115100 | A1 | 6/2006 | Faller | |
| 2007/0165869 | A1 | 7/2007 | Ojanpera | |
| 2007/0183617 | A1 | 8/2007 | Yokota et al. | |
| 2007/0213990 | A1 | 9/2007 | Moon et al. | |
| 2009/0252339 | A1 | 10/2009 | Obata et al. | |
| 2010/0174548 | A1 | 7/2010 | Beack et al. | |
| 2011/0013790 | A1 | 1/2011 | Hilpert et al. | |
| 2011/0022402 | A1 | 1/2011 | Engdegard et al. | |

FOREIGN PATENT DOCUMENTS

| | | | |
|---|---|---|---|
| CN | 101529501 | A | 9/2009 |
| EP | 1 691 348 | A1 | 8/2006 |
| EP | 2 083 584 | A1 | 7/2009 |
| JP | 51-92101 | A | 7/1976 |
| JP | 3-163997 | A | 7/1991 |
| JP | 09-046799 | A | 2/1997 |
| JP | 9-200897 | A | 7/1997 |
| JP | 2001-503581 | A | 3/2001 |
| JP | 2001-306081 | A | 11/2001 |
| JP | 2002-177452 | A | 6/2002 |
| JP | 2003-263858 | A | 9/2003 |
| JP | 2004-193877 | A | 7/2004 |
| JP | 2005-006018 | A | 1/2005 |
| JP | 2005-512434 | A | 4/2005 |
| JP | 2005-286828 | A | 10/2005 |
| JP | 2005-354695 | A | 12/2005 |
| JP | 2006-3580 | A | 1/2006 |
| JP | 2006-508592 | A | 3/2006 |
| JP | 2006-211206 | A | 8/2006 |
| JP | 2006-217210 | A | 8/2006 |
| JP | 2006-345480 | A | 12/2006 |
| JP | 2007-058930 | A | 3/2007 |
| JP | 2007-67463 | A | 3/2007 |
| JP | 2009-501346 | A | 1/2009 |
| JP | 2010-521002 | A | 6/2010 |
| RU | 2005103637 | A | 7/2005 |
| WO | WO 2004/008805 | A1 | 1/2004 |
| WO | WO 2006/022124 | A1 | 3/2006 |
| WO | WO 2006/072270 | A1 | 7/2006 |
| WO | WO 2006/084916 | A2 | 8/2006 |
| WO | WO 2006/126644 | A2 | 11/2006 |
| WO | WO 2006/126843 | A2 | 11/2006 |
| WO | WO 2007/004626 | A2 | 1/2007 |
| WO | WO 2007/004630 | A1 | 1/2007 |
| WO | WO 2007/013775 | A1 | 2/2007 |
| WO | WO 2007/027051 | A1 | 3/2007 |
| WO | WO 2007/034806 | A1 | 3/2007 |
| WO | WO 2008/046531 | A1 | 4/2008 |
| WO | WO 2008/089593 | A1 | 6/2008 |

OTHER PUBLICATIONS

"Call for Proposals on Spatial Audio Object Coding", ITU Study Group 16, Video Coding Experts Group, ISO/IEC JTC1/SC29/WG11, MPEG2007/N8853, Jan. 2007, pp. 1-20, Marrakech, Morocco.

Herre et al., "The Reference Model Architecture for MPEG Spatial Audio Coding", Audio Engineering Society, Convention Paper 6447, 118th Convention, May 28-31, 2005, Barcelona, Spain.

Breebaart et al., "MPEG Spatial Audio Coding/MPEG Surround: Overview and Current Status", Audio Engineering Society, Convention Paper, 119th Convention, Oct. 7-10, 2005, New York, NY.

Breebaart at al., "Multi-Channel Goes Mobile: MPEG Surround Binaural Rendering", Audio Engineering Society 29th International Conference Paper, Seoul, Korea, Sep. 2-4, 2006.

Faller et al., "Coding of Spatial Audio Compatibie with Different Playback Formats", Audio Engineering Society Convention Paper, 117th Convention, San Francisco, CA, pp. 2/12-10/12, Oct. 28-31, 2004.

Faller, "Parametric Coding of Spatial Audio", Presentee a La Faculte Informatique Et Communications, Institut de systemes de communication, Section Des Systemes De Communication, Ecole Polytechnique Federale de Lausanne, Pour L'Obtention du Grade de Docteur es Sciences, These No. 3062, 2004.

Liebchen et al., "Improved Forward-Adaptive Prediction for MPEG-4 Audio Lossless Coding", Audio Engineering Society 118th Convention Paper, May 28-31, 2005, Barceiona, Spain.

Liebchen et al., "The MPEG-4 Audio Lossless Coding (ALS) Standard-Technology and Applications", Audio Engineering Society 119th Convention Paper, Oct. 7-10, 2005, New York, NY.

Moon et al., "Multi-Channel Audio Compression Method with Virtual Source Location Information for MPEG-4 SAC", IEEE Transactions on Consumer Electronics, vol. 51, No. 4, Nov. 2005, pp. 1253-1256, "II Binaural Cue Coding" and "III VLSI Based SAC System".

Avendano et al., "Frequency Domain Techniques for Stereo to Multichannel Upmix", AES 22nd International Conference on Virtual, Synthetic and Entertainment Audio, Jun. 1, 2002, pp. 1-10, XP007905188.

Faller, "Matrix Surround Revisited", AES 30th International Conference, Mar. 15-17, 2007, pp. 1-7, XP002496463, Saariselka, Finland.

Jot et al., "Spatial Enhancement of Audio Recordings", AES 23rd International Conference, May 23-25, 2003, pp. 1-11, XP002401944, Copenhagen, Denmark.

Baeck et al., "CE on Multichannel Sound Scene Control for MPEG Surround," Electronics and Telecommunications Research Institute (ETRI), International Organisation for Standardisation, Organisation Internationale De Normalisation, ISO/IEC JTC1/SC29/WG11, MPEG2006/M13160, Montreux, Switzerland, 2006, pp. 1-9.

* cited by examiner

METHOD AND AN APPARATUS OF DECODING AN AUDIO SIGNAL

This application is the National Phase of PCT/KR2008/005291 filed on Sep. 8, 2008, which claims priority under 35 U.S.C. 119(e) to U.S. Provisional Application Nos. 60/970,524 filed on Sep. 6, 2007, 60/984,713 filed on Nov. 1, 2007 and 60/078,761 filed on Jul. 7, 2008, all of which are hereby expressly incorporated by reference into the present application.

TECHNICAL FIELD

The present invention relates to a method and apparatus for decoding an audio signal, and more particularly, to an apparatus for encoding/decoding an audio signal and method thereof. Although the present invention is suitable for a wide scope of applications, it is particularly suitable for enabling multi-channel audio signal to have a sound field effect.

BACKGROUND ART

Recently, the audio technology has established specifications for utilizing multi-channels. Yet, due to such a reason as massive 2-channel old contents, a producing cost of new multi-channel contents, a real use pattern of consumer and the like, 2-channel stereo systems are still used globally.

DISCLOSURE OF THE INVENTION

Technical Problem

However, in case of using such a stereo system, audio is reproduced in front of a user only. Therefore, limitation is put on the user in providing the user with a sufficient live ambience. Moreover, the audio fails to be utilized by a multimedia system supporting multi-channels. Cross-sectional audio is reproduced to fail in providing a stereo effect to a user.

Technical Solution

Accordingly, the present invention is directed to an apparatus for decoding an audio signal and method thereof that substantially obviate one or more of the problems due to limitations and disadvantages of the related art.

An object of the present invention is to provide an apparatus for decoding an audio signal and method thereof, by which a live ambience can be given to the audio signal in a manner of extracting an ambient component signal from an input signal and then modifying the extracted signal.

Another object of the present invention is to provide an apparatus for decoding an audio signal and method thereof, by which a stereo effect of the audio signal is reinforced in a manner of outputting the modified ambient component signal and source component signal having the ambient component signal removed therefrom via different output units, respectively.

Advantageous Effects

Accordingly, the present invention provides the following effects or advantages.

First of all, in an apparatus for decoding an audio signal and method thereof according to the present invention, an ambient component signal is extracted from an inputted audio signal based on correlation and is then modified using surround effect information. Therefore, the present invention provides an effect of enhancing a stereo effect of the audio signal.

Secondly, in an apparatus for decoding an audio signal according to the present invention, a modified ambient component signal and a source component signal are outputted using different signal output units, respectively. Therefore, the present invention can enhance a stereo effect of the audio signal.

Thirdly, in an apparatus for decoding an audio signal according to the present invention, a signal output unit for outputting an ambient component signal is arranged to have an output direction different from that of another signal output unit for outputting a source component signal. Therefore, the present invention is able to provide a listener with an audio signal of which an ambient sound is emphasized.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Figure 1:
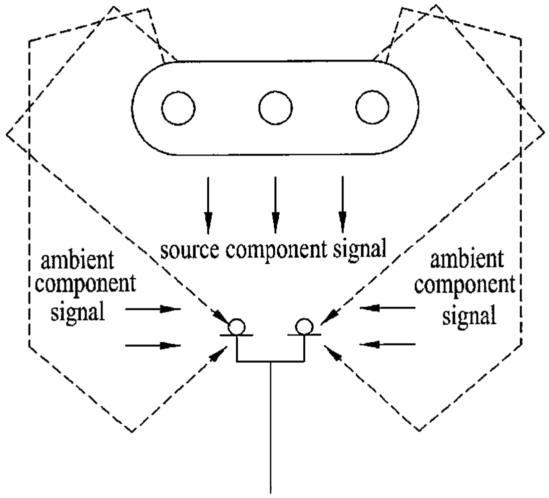
FIG. 1 and FIG. 2 are schematic diagrams of a general stereo recording environment.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of decoding an audio signal according to the present invention includes the steps of receiving the audio signal having a plurality of channel signals including an ambient component signal and a source component signal, extracting the ambient component signal and the source component signal of each of the channels based on correlation between the channel signals, modifying the ambient component signal using surround effect information, and generating the audio signal including a plurality of channels using the modified ambient component signal and the source component signal.

According to the present invention, the correlation is estimated at predetermined time and each predetermined frequency band.

According to the present invention, the ambient component signal has low correlation between component signals included in each of the channels.

According to the present invention, the surround effect information is level information applied to the ambient component signal.

According to the present invention, the surround effect information is a time delay, a gain value, filter or phase information applied to the ambient component signal.

According to the present invention, the method further includes the step of modifying the source component signals using extension effect information.

According to the present invention, the source component signal is obtained by eliminating the extracted ambient component signal from the received audio signal.

To further achieve these and other advantages and in accordance with the purpose of the present invention, an apparatus for decoding an audio signal includes an audio signal receiving unit receiving a plurality of channel signals including an ambient component signal and a source component signal, an ambient component signal extracting unit extracting the ambient component signal and the source component signal of each of the channels based on correlation between the channel signals, an ambient component signal modifying unit modifying the ambient component signal using surround effect information, a source component signal extracting unit extracting the source component signal of each of the channels based on the correlation between the channel signals, and a signal output unit outputting the ambient component signal and the source component signal.

To further achieve these and other advantages and in accordance with the purpose of the present invention, an apparatus for decoding an audio signal includes an audio signal receiving unit receiving the audio signal having a plurality of channel signals including an ambient component signal and a source component signal, an ambient component signal extracting unit extracting the ambient component signal of each of the channels based on correlation between the channel signals, an ambient component signal modifying unit modifying the ambient component signal using surround effect information, a source component signal extracting unit extracting the source component signal of each of the channels based on the correlation between the channel signals, a first signal output unit outputting the modified ambient component signal and the source component signal, and a second signal outputting unit outputting the received audio signal or the source component signal.

According to the present invention, the first signal output unit has an output direction not in parallel with that of the second signal output unit.

According to the present invention, the first signal output unit has the output direction located in a same plane of the output direction of the second signal output unit.

According to the present invention, the first signal output unit and the second signal output unit can configure a single output unit.

According to the present invention, each of the first and second signal output units includes a plurality of units outputting signals of different frequency bands, respectively.

According to the present invention, the first signal output unit has the output direction vertical to a plane including the output direction of the second signal output unit.

According to the present invention, the first signal output unit shifts the output direction according to characteristic information.

According to the present invention, the apparatus further includes an environment information generating unit generating environment information, wherein the ambient component signal modifying unit modifies the ambient component signal to have a prescribed stereo effect using the surround effect information and the environment information.

According to the present invention, the environment information generating unit generates the environment information based on an ambient characteristic between the first and second signal output units and a listening position.

According to the present invention, the environment information generating unit is able to generate the environment information using reflected positions and reflection quantities of output signals of the first and second output units, which are estimated using a detecting sensor.

According to the present invention, the environment information generating unit adopts one of previously stored environment information.

According to the present invention, the first signal output unit further includes an output delaying unit delaying an output time of the ambient component signal.

According to the present invention, the second signal output unit further includes an extension effect applying unit applying an extension effect to an output of the source component signal.

To further achieve these and other advantages and in accordance with the purpose of the present invention, a computer-readable recording medium includes a program recorded therein to perform the steps of receiving the audio signal having a plurality of channel signals including an ambient component signal and a source component signal, extracting the ambient component signal and the source component signal of each of the channels based on correlation between the channel signals, modifying the ambient component signal using surround effect information, and outputting the modified ambient component signal and the source component signal via different output units, respectively.

It is to be understood that both the foregoing general description and the following detailed description are exemplary and explanatory and are intended to provide further explanation of the invention as claimed.

MODE FOR INVENTION

Reference will now be made in detail to the preferred embodiments of the present invention, examples of which are illustrated in the accompanying drawings.

First of all, 'coding' in the present invention should be understood as the concept including both encoding and decoding.

Secondly, 'information' in this disclosure is the terminology that covers values, parameters, coefficients, elements and the like and may be interpreted different in some cases, by which examples of the present invention are non-limited. Although a stereo signal is used as an example for an audio signal in this disclosure, the audio signal can have at least three or more channels.

In general, in case of using an output unit having a stereo channel for a stereo signal, a listener receives an audio signal from left and right channels. The audio signal can be mainly divided into a left channel signal and a right channel signal. Each of the channel signals can include a having directionality and an ambient component signal giving a stereo effect without directionality.

For instance, the source component signal can be a sound of a singer on a stage, a sound of a musical instrument on a stage or the like for example. In case of movie, the source component signal can be conversations performed in front of listener, various sound effects or the like to enable the listener to sense a direction of the sound. On the contrary, the ambient component signal can include reverberant sound attributed to a listener-located physical environment, a sound of applause of audience, noise or the like. And, the ambient component signal play a role in enabling a listener to sense a feeling for a currently-located space, a stereo effect or the like. Namely, the source component signal is a signal heard in a specific direction and is generally generated in front of a listener. And, the ambient component signal is the sound heard in all directions without directionality.

The terminology 'front' used in this disclosure indicates a front side or a fore side. For instance, a front of a device (or unit) indicates a fore side seen by a screen part of the device (or unit). Disposing an output device (or unit) in a lateral rear side means that the output device (or unit) is disposed to have an output direction of 45°~135° with reference to a plane in which a screen part of a decoding device of an audio signal exists. And, disposing an output unit in a lateral front side means that the output device (or unit) is disposed to have an output direction of 0°~45° or 135°~180° with reference to a plane in which a screen part of a decoding device of an audio signal exists.

Figure 2:
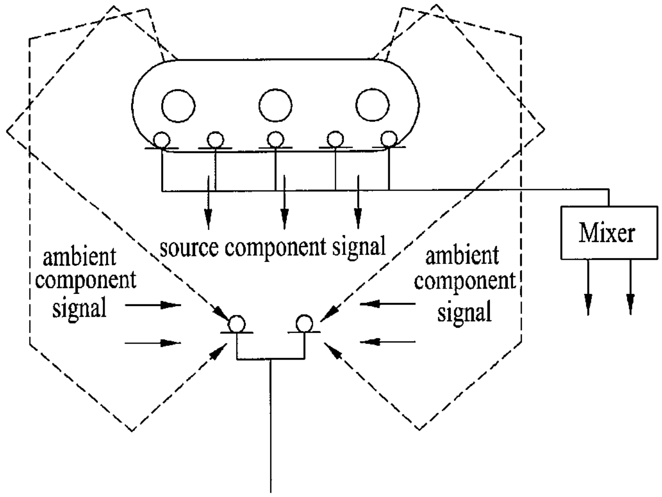

FIG. 1 and FIG. 2 are schematic diagrams of a general stereo recording environment.

Referring to FIG. 1, it is able to record a signal of a stereo channel by setting environment and position at which a listener can be located. Referring to FIG. 2, after signals have been acquired from an entity generating a source component signal using sever microphones, it is able to generate a stereo signal by mixing the acquired signals appropriately using a mixer.

Figure 3:
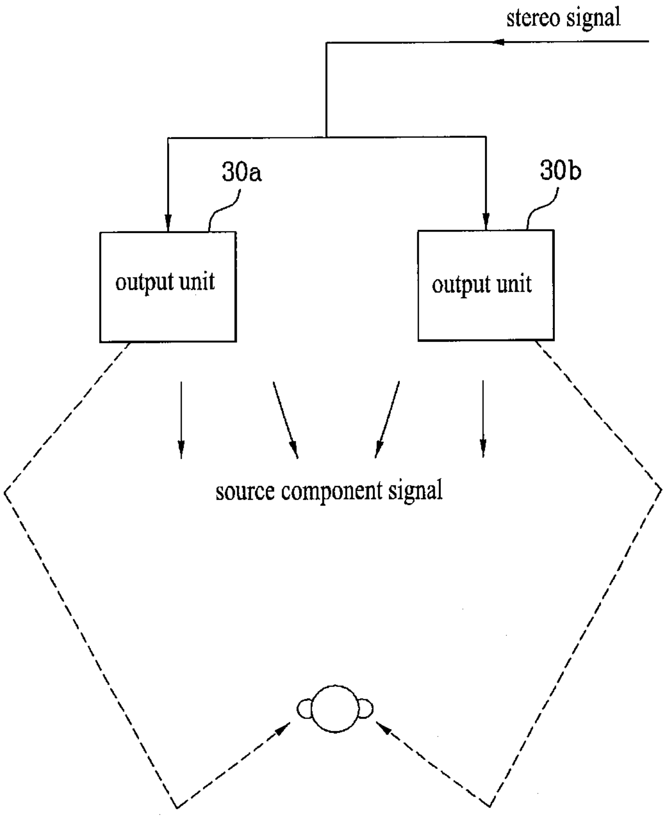
FIG. 3 is a schematic diagram for arrangement of a general output unit for outputting a stereo signal recorded by the method shown in FIG. 1 or FIG. 2.

FIG. 3 is a schematic diagram for arrangement of a general output unit for outputting a stereo signal recorded by the method shown in FIG. 1 or FIG. 2.

Referring to FIG. 3, when a stereo signal is reproduced, since an output unit (30*a*, 30*b*) of a stereo signal is generally located in front of a listener, the listener recognizes the stereo signal as if all sounds come from a front side. In this case, although a source component signal located in front is delivered to the listener without distortion, it is unable to deliver the ambient component signal coming from lateral and rear sides of the listener in a recording environment. Of course, as a stereo signal outputted from an output unit (30*a*, 30*b*) is reflected or absorbed in accordance with a listener-located environment, a reverberant sound can be heard. Yet, this is different from the ambient component signal of the recording environment. Hence, the listener is unable to listen to the ambient component signal in recording.

In an apparatus for decoding an audio signal and method thereof according to the present invention, ambient component signal included in a stereo signal is extracted and used. Therefore, it is able to obtain an audio signal having a stereo effect enhanced.

Figure 4:
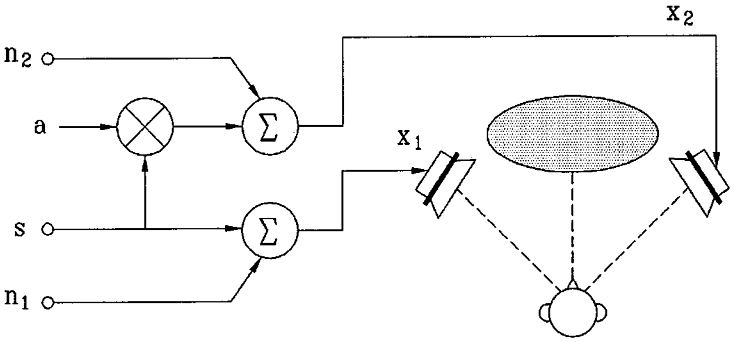
FIG. 4 is a schematic diagram for a method of outputting an audio signal according to one embodiment of the present invention.

FIG. 4 is a schematic diagram for a method of outputting an audio signal according to one embodiment of the present invention.

As mentioned in the foregoing description, a source component signal has the characteristic of directionality, whereas an ambient component signal does not have the directionality. A listener is able to recognize the directionality when the same signal arrives at both ears of the listener with either a level difference or a time difference or with both of the level difference and the time difference. Hence, the source component signal having the directionality has high correlation between two channels including the source component signal, whereas the ambient component signal enables the two channels to have low correlation. In order to extract the ambient component signal, a method of decoding an audio signal according to one embodiment of the present invention extracts component signals having low inter-channel correlation from component signals included in a stereo channel.

In FIG. 4, a source component signal s indicates a signal that represents a direct sound located in a direction determined by a gain factor a. Ambient component signals $n_1$ and $n_2$ indicate an ambient sound in a recording environment. And, '$x_1$' and '$x_2$' indicate output signals of left and right channels of the stereo signal, respectively. Moreover, the stereo signal can be outputted to the stereo channel with specific direction information. And, the direction information can include level difference information, time difference information or the like. On the contrary, the ambient component signal can be determined by a reproduction environment, an auditory sensible width, or the like. The output signals shown in FIG. 4 can be represented as Formula 1 using the source component signal s, the ambient component signals $n_1$ and $n_2$ and the gain factor a for determining a direction of the source component signal.

$$x_1(n)=s(n)+n_1(n)$$

$$x_2(n)=as(n)+n_2(n) \quad \text{[Formula 1]}$$

In order to effectively analyze a non-linear stereo signal including a plurality of simultaneously activated object signals, Formula 1 should be independently analyzed using plurally divided frequency bands and time domain. In this case, the $x_1$(n) and $x_2$(n) can be represented as follows.

$$X_1(i,k)=S(i,k)+N_1(i,k)$$

$$X_2(i,k)=A(i,k)S(i,k)+N_2(i,k) \quad \text{[Formula 2]}$$

The 'i' indicates a frequency band index and the 'k' indicates a time band index.

Figure 5:
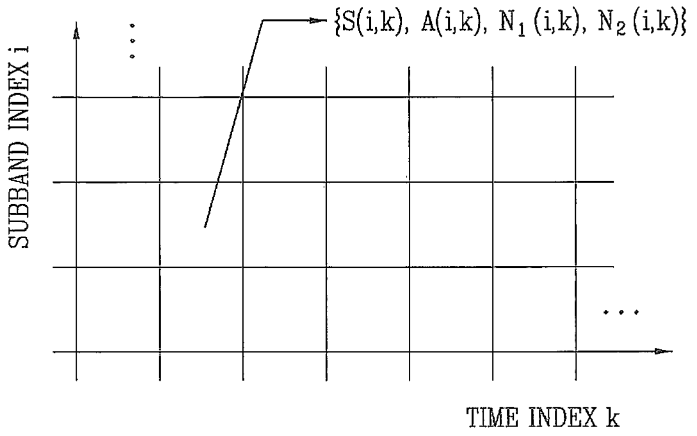
FIG. 5 is a graph of a time-frequency domain for analyzing a stereo signal according to one embodiment of the present invention.

FIG. 5 is a graph of a time-frequency domain for analyzing a stereo signal. Each time-frequency domain includes indexes i and k. And, a source component signal S, ambient component signals $N_1$ and $N_2$ and a gain factor A can be independently estimated. In the following description, the frequency band index i and the time band index k shall be omitted.

And, it is able use such a signal model as Formula 3.

$$x_L = \sum_{i=1}^{N} h_{head\_Li} * S_i + \sum_{i=1}^{N} h_{tail\_Li} * S_i + n_L \quad \text{[Formula 3]}$$

$$x_L = \sum_{i=1}^{N} h_{head\_Ri} * S_i + \sum_{i=1}^{N} h_{tail\_Ri} * S_i + n_R$$

In this case, h_head_Li and h_head_Ri correspond to head parts of a transfer function indicating a relation that an $i^{th}$ entity is included in channels L and R. h_tail_Li and h_tail_Ri correspond to tail parts of the transfer function and include reverberant components of s_i introduced into the respective channels. And, "*" indicates convolution. In this case, the ambient component signal corresponds to $$\sum_{i=1}^{N} h_{tail\_Xi} * S_i + n_X$$

of the right side in Formula 3.

Besides, mathematical modeling of the source component signal and the ambient component signal is possible through various signal models. Yet, in the audio signal decoding apparatus and method of the present invention, the source component signal and the ambient component signal are estimated and modified using the signal model represented as Formula 1 and Formula 2, which non-limits various examples of the present invention.

A bandwidth of a frequency band for analysis of a stereo signal can be selected to be equal to that of a specific band and can be determined according to characteristics of the stereo signal. In each frequency band, S, $N_1$, $N_2$ and A can be estimated per t millisecond. If $X_1$ and $X_2$ are given as stereo signal, estimated values of S, $N_1$, $N_2$ and A can be determined according to the analysis per time-frequency domain. And, a power of $X_1$ can be estimated as Formula 4.

$$P_{X1}(i,k)=E\{X_1{}^2(i,k)\} \quad \text{[Formula 4]}$$

In Formula 4, E{.} indicates an average.

Assume that powers of $N_1$ and $N_2$ are equal to each other. And, assume that the dependent signals having external influence have the same power in left and right channels of a stereo channel ($P_N=P_{N1}=P_{N2}$).

Besides $P_N=P_{N1}=P_{N2}$ it is able to use such assumption as $A^2P_{N1}=P_{N2}$ and the like for example.

Moreover, if a stereo signal is represented as time-frequency domain, it is able to estimate gain information (A), power of source component signal ($P_s$), power of ambient component signal ($P_N$) and normalized cross-correlation ($\phi$). The normalized cross-correlation ($\phi$) between stereo channels can be represented as Formula 5.

$$\phi(i.k) = \frac{E\{X_1(i,k)X_2(i,k)\}}{\sqrt{E\{X_1^1(i,k)\}E\{X_2^2(i,k)\}}} \quad \text{[Formula 5]}$$

It is able to determine $A, P_S, P_N$ using $P_{X1}, P_{X2}, \phi$. And the relation formula for the $P_{X1}, P_{X2}, \phi$ can be represented as Formula 6.

$$P_{X1} = P_S + P_N, \quad \text{[Formula 6]}$$

$$P_{X2} = A^2 P_S + P_N,$$

$$\phi = \frac{AP_S}{\sqrt{P_{X1}P_{X2}}}$$

Formula 6 is summarized for $A, P_S, P_N$ into Formula 7.

$$A = \frac{B}{2C}, \quad \text{[Formula 7]}$$

$$P_S = \frac{2C^2}{B},$$

$$P_N = X_1 - \frac{2C^2}{B}$$

And, values of the B and C can be represented as Formula 8.

$$B=P_{X2}-P_{X1}+\sqrt{(P_{X1}-P_{X2})^2+4P_{X1}P_{X2}\phi^2},$$

$$C=\phi\sqrt{P_{X1}P_{X2}} \quad \text{[Formula 8]}$$

Source component signal S and minimum square estimated values of $N_1$ and $N_2$ are calculated as the function of A, $P_s$ and $P_N$. And, for each of the i and the k, the source component signal S can be estimated as follows.

$$\hat{S}=\omega_1X_1+\omega_2X_2=\omega_1(S+N_1)+\omega_2(AS+N_2) \quad \text{[Formula 9]}$$

In Formula 9, $\omega_1$ and $\omega_2$ are real weights. In this case, estimation error can be represented as Formula 10.

$$E=(1-\omega_1-\omega_2A)S-\omega_1N_1-\omega_2N_2 \quad \text{[Formula 10]}$$

The weights $\omega_1$ and $\omega_2$ become optimal on a least mean square when the estimation error E is orthogonal to $X_1$ and $X_2$.

$$E\{EX_1\}=0 \text{ and } E\{EX_2\}=0 \quad \text{[Formula 11]}$$

Namely, when $E\{EX_1\}=0$ and $E\{EX_2\}=0$, it is able to obtain two equations of Formula 12 from Formula 10 and Formula 11.

$$(1-\omega_1-\omega_2A)P_S-\omega_1P_N=0$$

$$A(1-\omega_1-\omega_2A)P_S-\omega_2P_N=0 \quad \text{[Formula 12]}$$

From Formula 12, the weights $\omega_1$ and $\omega_2$ can be calculated into Formula 13.

$$\omega_1 = \frac{P_S P_N}{(A^2+1)P_S P_N + P_N^2} \quad \text{[Formula 13]}$$

$$\omega_2 = \frac{A P_S P_N}{(A^2+1)P_S P_N + P_N^2}$$

Similarly, $N_1$ and $N_2$ can be estimated. The estimated value of $N_1$ is represented as Formula 14.

$$\hat{N}_1 = \omega_3 X_1 + \omega_4 X_2 = \omega_3(S+N_1) + \omega_4(AS+N_2) \quad \text{[Formula 14]}$$

And, estimation error can be calculated as follows.

$$E = -(-\omega_3 - \omega_4 A)S - (1-\omega_3)N_1 - \omega_2 N_2 \quad \text{[Formula 15]}$$

The weights $\omega_1$ and $\omega_2$ are calculated into Formula 16 in a manner that the estimation error E is orthogonal to $X_1$ and $X_2$.

$$\omega_3 = \frac{A^2 P_S P_N + P_N^2}{(A^2+1)P_S P_N + P_N^2} \quad \text{[Formula 16]}$$

$$\omega_4 = \frac{-A P_S P_N}{(A^2+1)P_S P_N + P_N^2}$$

Moreover, the estimation value of $N_2$ is calculated in a manner similar to that of $N_1$. The $N_2$ is represented as Formula 17 and weights of the $N_2$ are calculated as Formula 18.

$$\hat{N}_2 = \omega_5 X_1 + \omega_6 X_2 = \omega_5(S+N_1) + \omega_6(AS+N_2) \quad \text{[Formula 17]}$$

$$\omega_5 = \frac{-A P_S P_N}{(A^2+1)P_S P_N + P_N^2} \quad \text{[Formula 18]}$$

$$\omega_6 = \frac{P_S P_N + P_N^2}{(A^2+1)P_S P_N + P_N^2}$$

Thus, after minimum square estimation values of $\hat{S}$, $\hat{N}_1$ and $\hat{N}_2$ have been calculated, they are post-scaled so that powers of the estimation values ($\hat{S}$, $\hat{N}_1$, $\hat{N}_2$) become identical to $P_S$ and $P_N = P_{N1} = P_{N2}$. The power of $P_S$ can be represented as Formula 19.

$$P_{\hat{S}} = (\omega_1 + a\omega_2)^2 P_S + (\omega_1^2 + \omega_2^2) P_N \quad \text{[Formula 19]}$$

In order to obtain the estimation value of S having the power $P_{\hat{S}}$ shown in Formula 19, $\hat{S}$ is called as Formula 20.

$$\hat{S}' = \frac{\sqrt{P_N}}{\sqrt{(\omega_1 + a\omega_2)^2 P_S + (\omega_1^2 + \omega_2^2) P_N}} \hat{S} \quad \text{[Formula 20]}$$

In the same manner for $\hat{S}'$, $\hat{N}'_1$ and $\hat{N}'_2$ can be scaled as Formula 21 and Formula 22.

$$\hat{N}'_1 = \frac{\sqrt{P_N}}{\sqrt{(\omega_3 + a\omega_4)^2 P_S + (\omega_3^2 + \omega_4^2) P_N}} \hat{N}_1 \quad \text{[Formula 21]}$$

$$\hat{N}'_2 = \frac{\sqrt{P_N}}{\sqrt{(\omega_5 + a\omega_6)^2 P_S + (\omega_5^2 + \omega_6^2) P_N}} \hat{N}_2 \quad \text{[Formula 22]}$$

Figure 6:
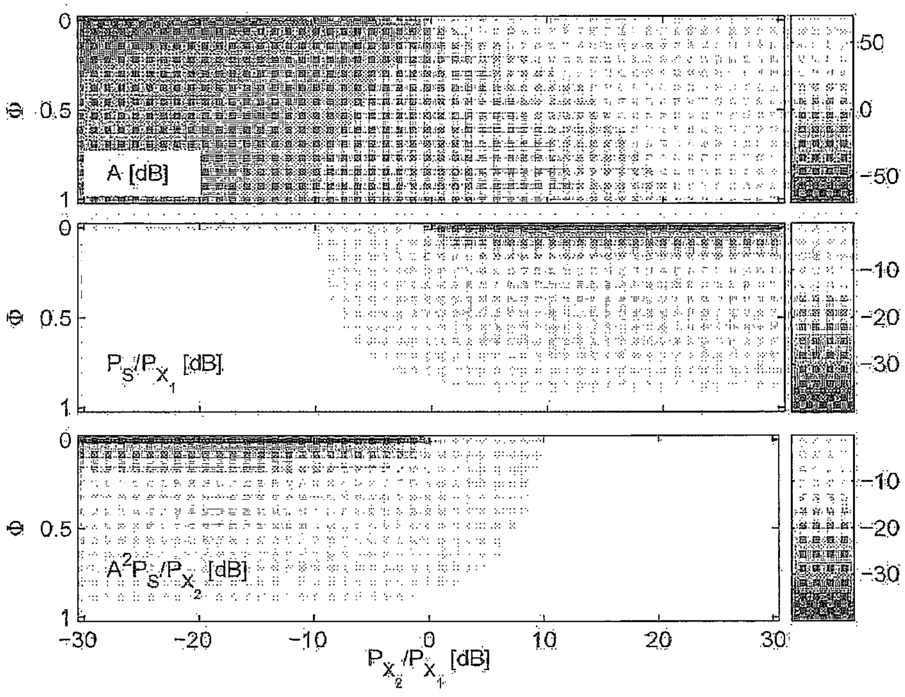
FIG. 6 is a graph for a gain factor A, a source component signal S and the normalization power of AS corresponding to multiplication of the gain factor and the source component signal.

Meanwhile, FIGS. 6 to 10 are graphs of relations of various variables calculated until the $\hat{S}'$, $\hat{N}'_1$, and $\hat{N}'_2$ are obtained. First of all, the normalized power of the gain factors A, S and AS can be represented as a function of the level difference of stereo signal and the normalized cross-correlation Φ. This is shown in FIG. 6.

Figure 7:
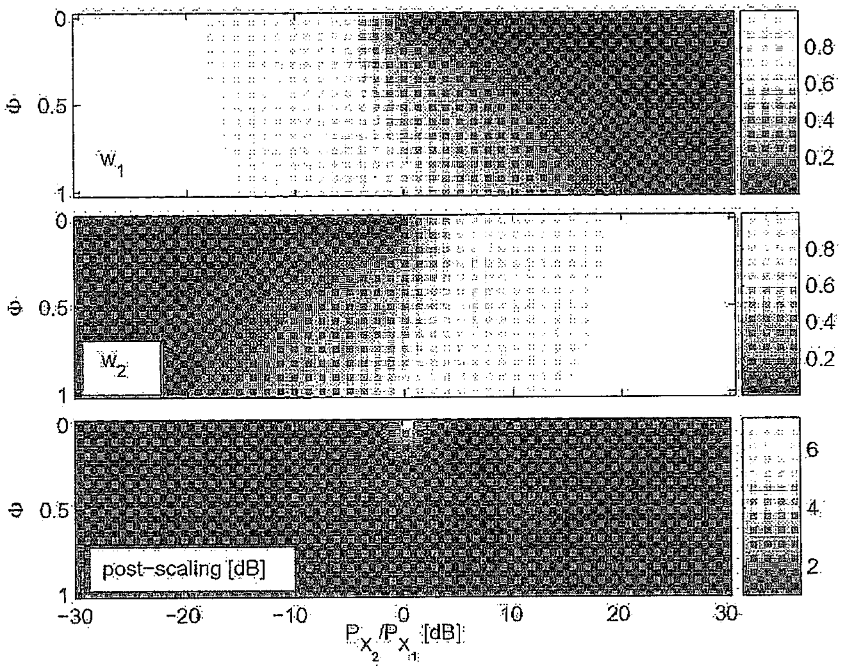
FIG. 7 is a graph of a post-scaling factor for weights $\omega_1$, $\omega_2$ and $\hat{S}'$ according to one embodiment of the present invention.

In FIG. 7, weights $\omega_1$ and $\omega_2$ for calculating minimum square estimation value of S are represented as a function of the level difference of stereo signal and the normalized cross-correlation Φ and are shown on the two upper graphs, respectively. And, a post-scaling factor for $\hat{S}'$ in Formula 19 is represented as a lower graph in FIG. 7.

Figure 8:
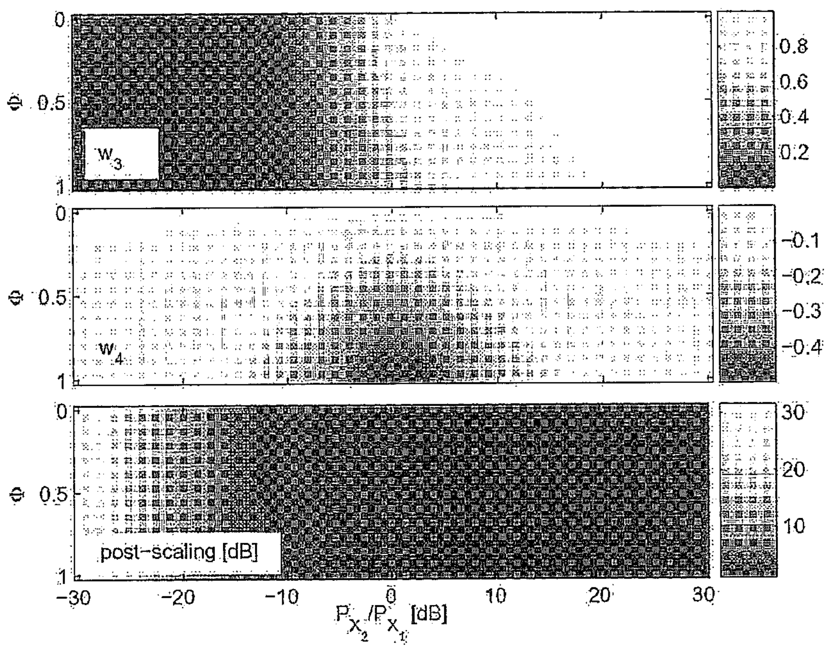
FIG. 8 is a graph of a post-scaling factor for weights $\omega_3$, $\omega_4$ and $\hat{N}'_1$ according to one embodiment of the present invention.

In FIG. 8, weights $\omega_3$ and $\omega_4$ for calculating minimum square estimation value of $N_1$ are represented as a function of the level difference of stereo signal and the normalized cross-correlation Φ and are shown on the two upper graphs, respectively. And, a post-scaling factor for $\hat{N}'_1$ in Formula 19 is represented as a lower graph in FIG. 8.

Figure 9:
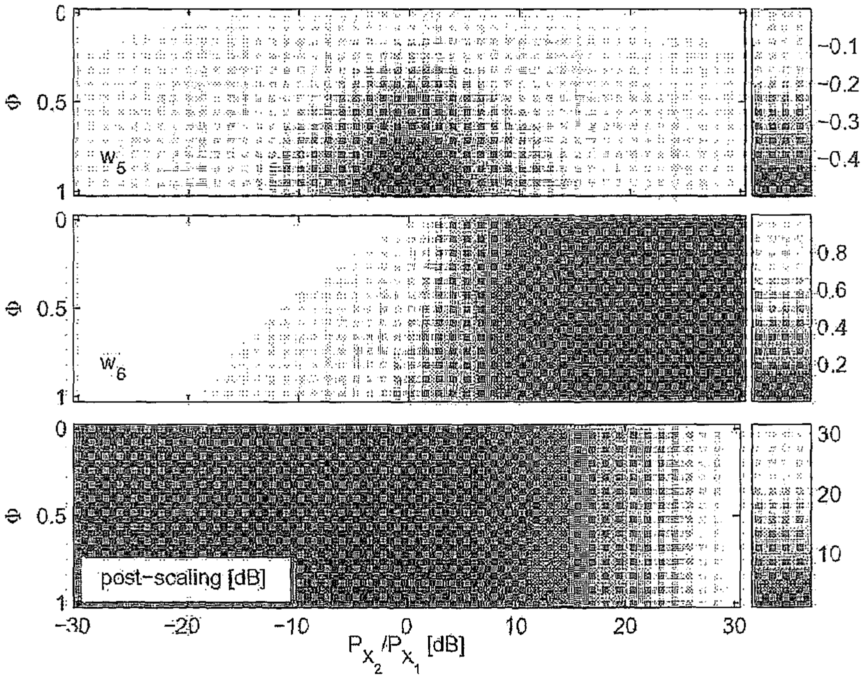
FIG. 9 is a graph of a post-scaling factor for weights $\omega_5$, $\omega_6$ and $\hat{N}'_2$ according to one embodiment of the present invention.

In FIG. 9, weights $\omega_5$ and $\omega_6$ for calculating minimum square estimation value of $N_2$ are represented as a function of the level difference of stereo signal and the normalized cross-correlation Φ and are shown on the two upper graphs, respectively. And, a post-scaling factor for $\hat{N}'_2$ in Formula 19 is represented as a lower graph in FIG. 9.

Figure 10:
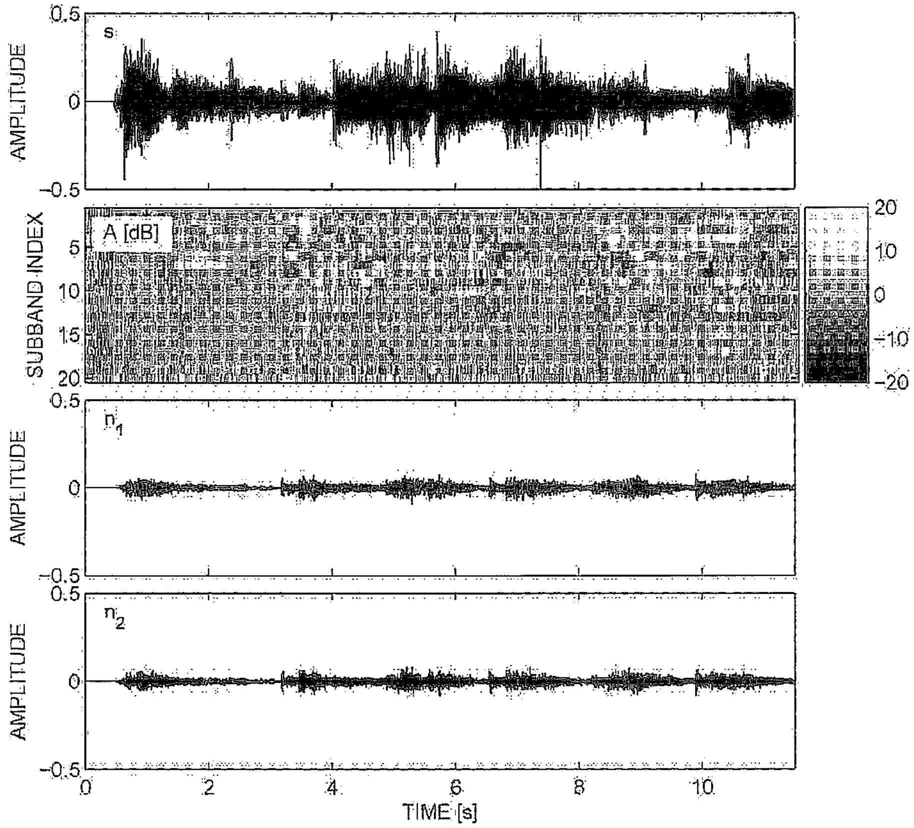
FIG. 10 is a graph of ambient decomposition of an audio signal listened at a center according to one embodiment of the present invention.

FIG. 10 is a graph of ambient decomposition of a stereo signal (e.g., folk song) including voice (e.g., vocal, voice) listened at a center when the stereo signal is outputted via an output unit. And, the estimated s, A, $n_1$ and $n_2$ are shown in FIG. 10. A source component signal s (e.g., vocal) and ambient component signals $n_1$ and $n_2$ (e.g., BGM) are depicted on a time domain. And, a gain factor A is depicted on all time-frequency tiles.

Referring to FIG. 10, compared to the ambient component signals $n_1$ and $n_2$, the estimated source component signal s is observed as relatively strong. This matches the fact that the source component signal is dominant at the center in recording. Thus, it is apparent to those skilled in the art that the source and ambient component signals included in recording a stereo signal can be estimated by the audio signal decoding method according to the present invention.

As mentioned in the above description, an apparatus for decoding an audio signal according to the present invention estimates ambient component signals and a source component signal, extracts the ambient component signal using the estimated signals, and then modifies the extracted ambient component signal. Therefore, it is able to obtain an audio signal of which stereo effect is further enhanced.

Figure 11:
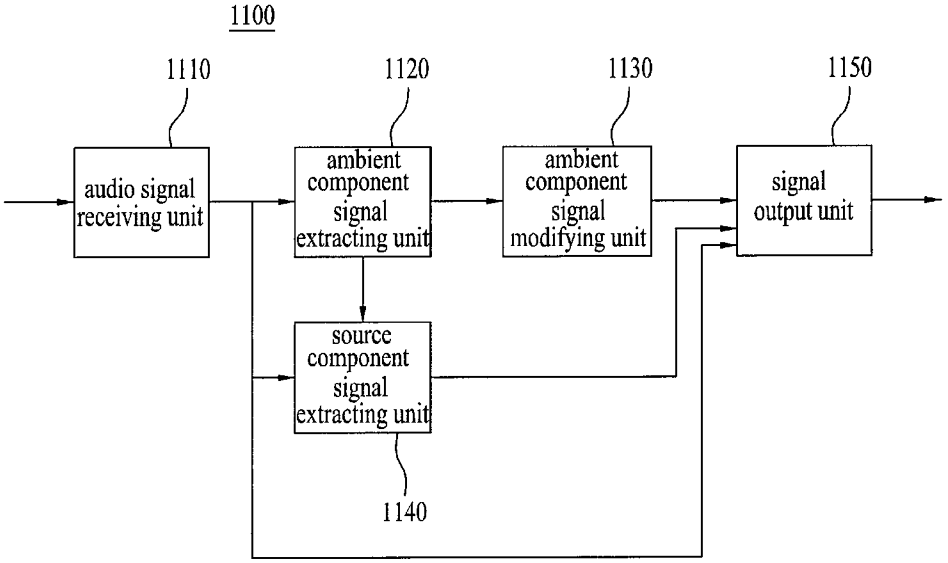
FIG. 11 is a schematic block diagram of an apparatus for decoding an audio signal according to one embodiment of the present invention.

FIG. 11 is a schematic block diagram of an apparatus 1100 for decoding an audio signal according to the present invention.

First of all, an audio signal receiving unit 1110 receives an audio signal inputted from an outside of the audio signal decoding apparatus. The inputted audio signal includes a plurality of channels which may correspond to a stereo channel or a multi-channel including at least three channels. And, the audio signal can include ambient component signals and source component signals. And, theses signals can be included to correspond to the channels, respectively. For instance, in case that the audio signal includes two source component signals (e.g., vocal1 and vocal2), each of the source component signals is included in the corresponding channel with a time difference and/or a level difference.

An ambient component signal extracting unit 1120 receives the audio signal and then extracts the ambient component signal of each of the channels based on correlation between the signals included to correspond to each other. In doing so, the ambient component signal extracting unit 1120 is able to estimate the ambient component signal using Formulas 1 to 22, by which examples of the present invention are non-limited. The correlation used in extracting the ambient component signal can be estimated each predetermined time or each predetermined frequency band. Generally, the ambient component signal has low correlation between component signals included in each channel, whereas the source component signal has high correlation.

An ambient component signal modifying unit 1130 receives the extracted ambient component signal and is then able to modify the ambient component signal to have a prescribed stereo effect using surround effect information. In this case, the surround effect information can be included in a bitstream indicating the audio signal inputted to the audio signal receiving unit 1110 or can be stored in the ambient component signal modifying unit 1130 of the audio signal decoding apparatus of the present invention. Besides, the surround effect information can be inputted by a listener via a listener inputting device (not shown in the drawing).

The surround effect information can include level information applied to the ambient component signal or at least one of a delay effect, a filter and a gain value. By modifying the ambient component signal, it is able to improve the degradation of the stereo effect generated when the stereo signal, as shown in FIG. 3, is reproduced in the front side only. The level information enables the generation of an ambient component signal, of which level is low or is modified large by applying a level size of the extracted ambient component signal. The surround effect information can be phase information applied to the ambient component signal. And, the phase information can enhance the stereo effect of the ambient component signal by adjusting a phase of the ambient component signal. In particular, it is able to enhance the stereo effect of the audio signal by increasing reverberation in a manner of delaying an output of the ambient component signal by applying a delay effect, which is an example of the surround effect information, to the ambient component signal. The corresponding detailed functions and roles of the ambient component signal modifying unit 1130 will be explained with reference to FIG. 12 and FIG. 13 in the following description.

A source component signal extracting unit 1140 receives the audio signal inputted to the audio signal receiving unit 1110 and the ambient component signal extracted by the ambient component signal extracting unit 1120 and then extracts the source component signal by removing the ambient component signal from the audio signal. And, it is able to use the estimated source component signal (S), which is estimated by performing the procedures of Formulas 1 to 22 on the audio signal inputted to the audio signal receiving unit 1110, as the source component signal extracted by the source component signal extracting unit 1140.

A signal output unit 1150 outputs a stereo signal to an external environment of the audio signal decoding apparatus by receiving and combining the source component signal extracted by the source component signal extracting unit 1140 and the ambient component signal modified by the ambient component signal modifying unit 1130 together. The signal output unit 1150 is able to output the audios signal received by the audio signal receiving unit 1110, i.e., a channel signal instead of the source component signal extracted by the source component signal extracting unit 1140 and is also able to output the source component signal and the received audio signal together with the ambient component signal. And, the audio signal received by the audio signal receiving unit 1110 can include flag information indicating whether the signal output unit 1150 outputs at least one of the source component signal and the audio signal. The signal output unit 1150 can include a single output unit or can include at least two output units. In case that the signal output unit 1150 includes the at least two output units, functions and configurations of the output units may differ from each other and can be disposed in various configurations. Details regarding the signal output unit 1150 will be explained with reference to FIGS. 16 to 25 later.

In an apparatus for decoding an audio signal according to another embodiment of the present invention, the ambient information signal modifying unit 1130 applies a filter, which is an example of the surround effect information, to an ambient information signal is then able to modify a stereo signal outputted by the signal output unit 1150 to be similar to a signal ($L_0$,$R_0$) of a general 5.1-channel output signal listened to by a listener.

Figure 12:
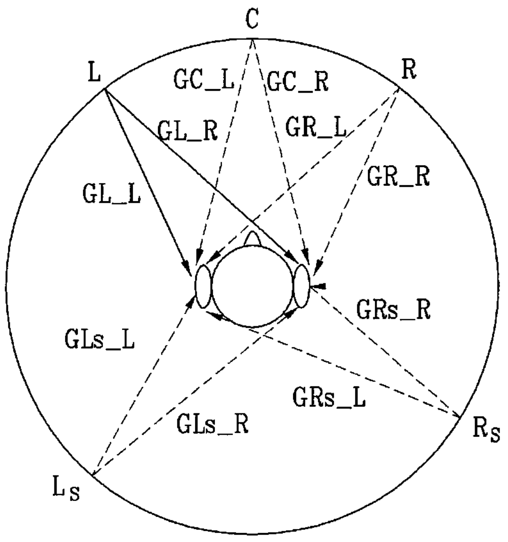
FIG. 12 is a diagram for a general 5.1-channel configuration and a path of a signal introduced into a listener.

FIG. 12 is a diagram for a general 5.1-channel configuration and a path of a signal introduced into a listener. As shown in FIG. 12, GX_Y indicates a transfer function for transferring a signal to a ear Y from a speaker X. For instance, GL_R indicates a transfer function for a sound of a channel L to enter a right ear of a listener and GC_R indicates a transfer function for a sound of a channel C to enter a right ear of a listener. And, the GX_Y is named a head-related transfer function (hereinafter called 'HRTF').

The signals ($L_0$,$R_0$) entering the listener's ears can be represented as Formula 23 with reference to FIG. 12.

$$L_0=L*GL\_L+C*GC\_L+R*GR\_L+L_S*GL_S\_L+R_S*GR_S\_L$$

$$R_0=L*GL\_R+C*GC\_R+R*GR\_R+L_S*GL_S\_R+R_S*GR_S\_R \quad \text{[Formula 23]}$$

By referring to this, a stereo signal (L',R') outputted from the audio signal decoding apparatus of the present invention can be represented as Formula 24.

$$L'=D(L)+G\_L*A(L)$$

$$R'=D(R)+G\_R*A(R) \quad \text{[Formula 24]}$$

The L' and R' indicate output signals of channels, respectively. D(L) and D(R) indicate source component signals of channel L and R input signals, respectively. A(L) and A(R)® indicate ambient component signals. G_L and G_R indicate filters applied to ambient sound components of the channels, respectively.

Thus, the ambient component signal modifying unit 1130 is able to modify the ambient component signal to have a prescribed ambient effect using a filter applied to the corresponding ambient component signal. The filter can be included in a bitstream indicating the audio signal inputted to the audio signal receiving unit 1110. The filter can be stored in the ambient component signal modifying unit 1130 of the audio signal decoding apparatus of the present invention. The filter can be inputted via an input device (not shown in the drawing) by a listener. The G_X can be a fixed value or a variable value that varies according to a listener's request. The G_X can provide an effect that the ambient component signal is reproduced at a random virtual position instead of a position of the conventional output unit L or R. Therefore, the G_X can use the HRTF or can be configured by considering cross-talk of the HRTF, by which examples of the present invention are non-limited.

Figure 13:
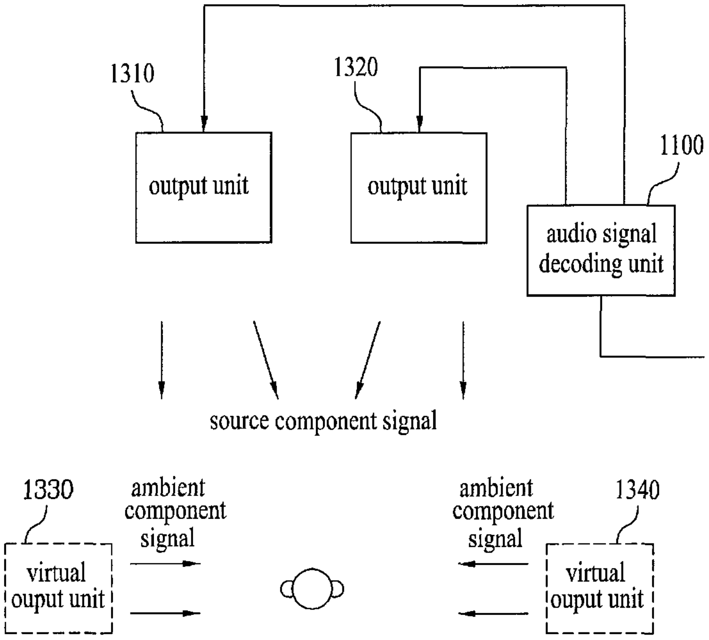
FIG. 13 is a diagram for an output of a stereo signal including a modified ambient component signal according to one embodiment of the present invention.

FIG. 13 is a diagram for an output of a stereo signal including a ambient component signal modified using the filter of Formula 24.

Referring to FIG. 13, in case that an audio signal decoded according to one embodiment of the present invention is outputted by two output units 1310 and 1320, a listener is able to hear source component signals from the output units 1310 and 1320 disposed in front of the listener. On the contrary, the listener senses filter-applied ambient component signals as if they are outputted from positions of virtual output units 1330 and 1340, respectively. As the effect of using lateral/rear output units for the ambient component signals additionally is obtained to enhance the stereo effect, the listener is able to enjoy the stereo sound effectively using the stereo signal and device.

An audio signal decoding apparatus according to another embodiment of the present invention is able to give a stereo effect to an audio signal by modifying an extracted source component. And, a corresponding audio signal decoding apparatus is explained with reference to FIG. 14 and FIG. 15 as follows.

Figure 14:
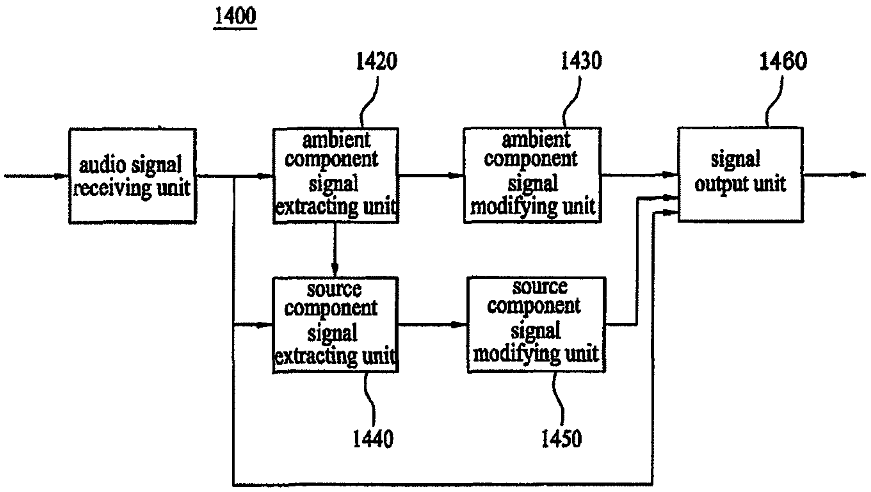
FIG. 14 is a schematic block diagram of an audio signal decoding apparatus having a source component modifying unit according to one embodiment of the present invention.

FIG. 14 is a schematic block diagram of an audio signal decoding apparatus 1400 having a source component modifying unit according to another embodiment of the present invention.

First of all, the audio signal decoding apparatus 1400 mainly includes a ambient component signal extracting unit 1420, a ambient component signal modifying unit 1430, a source component signal extracting unit 1440, a source component signal modifying unit 1450 and a signal output unit 1460. Since the ambient component signal extracting unit 1420, the ambient component signal modifying unit 1430, the source component signal extracting unit 1440 and the signal output unit 1460 play the same functions and roles of the elements having the same names of the former audio signal decoding apparatus 1100 shown in FIG. 11, their details will be omitted in the following description.

The source component signal modifying unit 1420 receives a source component signal extracted by the source component signal extracting unit 1440 and is then able to modify the source component signal to enhance a stereo effect. The source component signal modifying unit 1420 is able to use a filter capable of giving a surround effect or an extension effect to the source component signal, by which examples of the present invention are non-limited.

Figure 15:
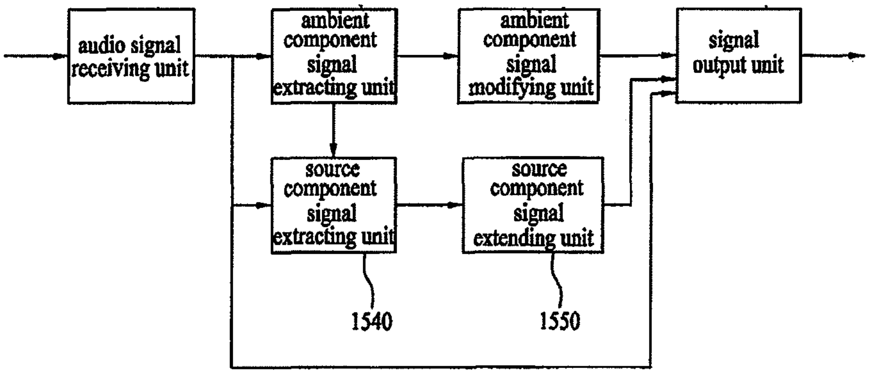
FIG. 15 is a schematic partial block diagram of an audio signal decoding apparatus having a source component signal extending unit according to one embodiment of the present invention.

FIG. 15 is a schematic partial block diagram of portions of an audio signal decoding apparatus for modifying a source component signal using a filter for giving an extension effect. In the present invention, the extension effect means the effect of increasing distances of source component signals included in a channel signal in a space. And, an output signal including the extension effect applied source component signals can provide a stereo effect as if being listened to a wide space such as an auditorium, a stadium and the like. A source component signal extracting unit 1540, of which function and role are equivalent to those of the former source component signal extracting unit 1140, extracts a source component signal from the inputted audio signal. Meanwhile, the source component signal extending unit 1550 receives the source component signal and then generates a source component signal, of which distance between the source components is extended, by applying a filter of giving an extension effect to the received source component signal.

Thus, in the audio signal decoding apparatus according to the present invention, an ambient component signal and/or a source component signal is extracted from an audio signal and is then modified. The modified ambient and/or source component signal is mixed and then outputted. Therefore, it is able to increase the stereo effect generated by the ambient or environmental influence in the recording environment. And, it is able to obtain an audio signal having the enhanced stereo effect using the stereo signal and device only as if using a multi-channel.

Unlike the former embodiment for further enhancing the stereo effect of the stereo signal in a manner of mixing a modified ambient component signal and a modified source component signal together and then outputting the mixed signal via a single output unit, another embodiment of the present invention proposes an audio signal decoding apparatus having an output unit for outputting an ambient component signal separate from an audio signal including a source component signal and/or a channel signal.

Figure 16:
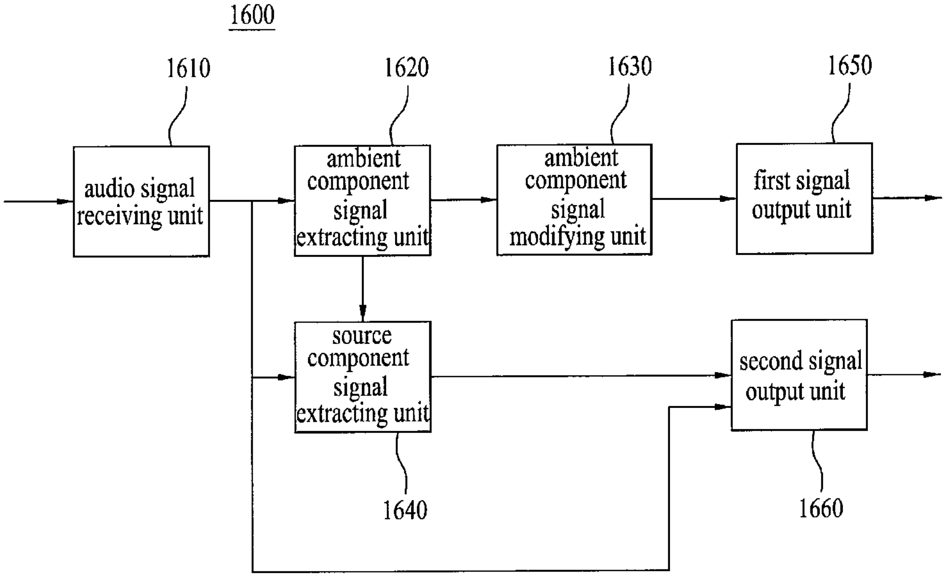
FIG. 16 is a schematic block diagram of an apparatus for decoding an audio signal according to one embodiment of the present invention.

FIG. 16 is a schematic block diagram of an apparatus 1600 for decoding an audio signal according to another embodiment of the present invention.

Referring to FIG. 16, the audio signal decoding apparatus 1600 have the same functions and roles of the former decoding apparatus 1100 shown in FIG. 11 in part. Hence, details of an audio signal receiving unit 1610, an ambient component signal extracting unit 1620, an ambient component signal modifying unit 1630 and a source component signal extracting unit 1640 are omitted in the following description. And, the audio signal decoding apparatus 1600 can further include a source component signal modifying unit (not shown in the drawing) for enhancing a stereo effect of a source component signal by receiving the source component signal from the source component signal extracting unit 1640 and then applying a filter for giving an extension effect or a surround effect.

The ambient component signal modified by the ambient component signal modifying unit 1630 is outputted via a first signal output unit 1650 and the source component signal or the audio signal received by the audio signal receiving unit 1610 is outputted via a second signal output unit 1660. And, both of the source component signal and the audio signal can be outputted via the second signal output unit 1660. Moreover, the audio signal received by the audio signal receiving unit 1610 can include flag information indicating whether at least one of the source component signal and the audio signal is outputted by the signal output unit 1650. In the following description, the second signal output unit 1660 is non-limited to the function of outputting the source component signal but is understood as outputting the source component signal and the audio signal or the audio signal. And, the audio signal of the present invention includes a plurality of channel signals including the source component signal and the ambient component signal.

Each of the first signal output unit 1650 and the second signal output unit 1660 is configured with a single unit or can be configured with at least two units. For instance, in case that an output system of an audio signal is a stereo system, the first signal output unit 1650 can include two first signal output units corresponding to left and right channels, respectively. And, the second signal output unit 1660 can include two second signal output units corresponding to left and right channels, respectively.

Although the present invention relates to a case that the output system of the audio signal includes the stereo system, it can be a multi-channel system configured in a manner that each of the first and second signal output units 1650 and 1660 includes at least three units.

According to one embodiment of the present invention, the audio signal decoding apparatus further includes a first signal output unit for outputting a modified ambient component signal only as well as a second output unit for outputting an audio signal or a source component signal, thereby enhancing a stereo effect of the audio signal. Moreover, by disposing the first signal output unit and the second signal output unit to differing in output directions from each other, a listener is enabled to listen to the audio signal having the enhanced stereo effect. The first and second signal output units for providing the stereo effect enhanced audio signal are explained with reference to FIGS. 17 to 22 as follows.

First of all, in an audio signal decoding apparatus such as a TV, an audio system and the like, a signal output unit should be disposed within a limited space as long as a separate output unit separated from the decoding apparatus is used. Generally, a second signal output unit for outputting an audio signal or a source component signal has an output direction toward a listener (hereinafter named 'front side'). And, it is effect to deliver a stereo effect if a first signal output unit for outputting an ambient component signal is disposed in rear or lateral side of a listener. Yet, due to the disposition within the limited space, the first signal output unit is disposed around the second signal output unit.

Figure 17:
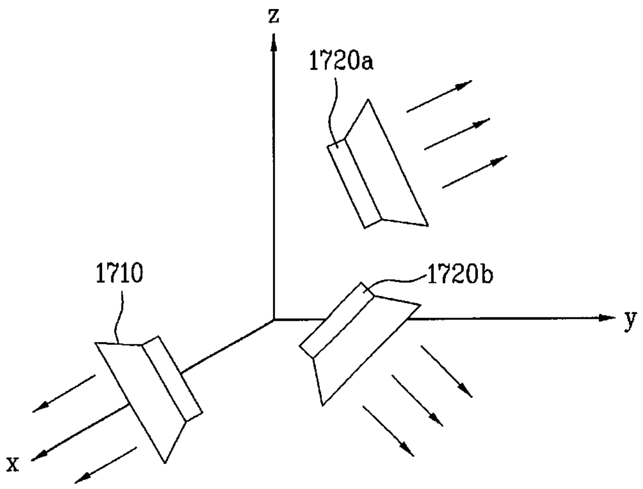
FIG. 17 is a graph for disposition of first and second signal output units included in an apparatus for decoding an audio signal according to one embodiment of the present invention.

FIG. 17 is a graph for disposition of first and second signal output units. A second signal output unit 1710 has an x-direction output direction. And, first signal output units 1720*a* and 1720*b* have output directions differing from that of the second signal output unit 1710.

Referring to FIG. 17, the first signal output unit 1720*a* outputting a ambient component signal can be disposed to have an output direction not in parallel with that of the second signal output unit 1710 and may not exit on a plane where the second signal output unit 1710 is located. Moreover, referring to FIG. 17, the first signal output unit 1720*b* is located on the same place of the x-y plane where the second signal output unit 1710 is located and can have an output direction not in parallel with that of the second signal output unit 1710.

The second signal output unit 1710 is responsible for a reproduction of an audio signal or a source component signal and the first signal output unit 1720*a* or 1720*b* having the output direction not in parallel with that of the second signal output unit 1710 is responsible for a reproduction of an ambient component signal. Therefore, compared to the case of reproducing the stereo signal using the second signal output unit 1710 only, this case can provide a listener with the audio signal having the enhanced stereo effect.

Figure 18:
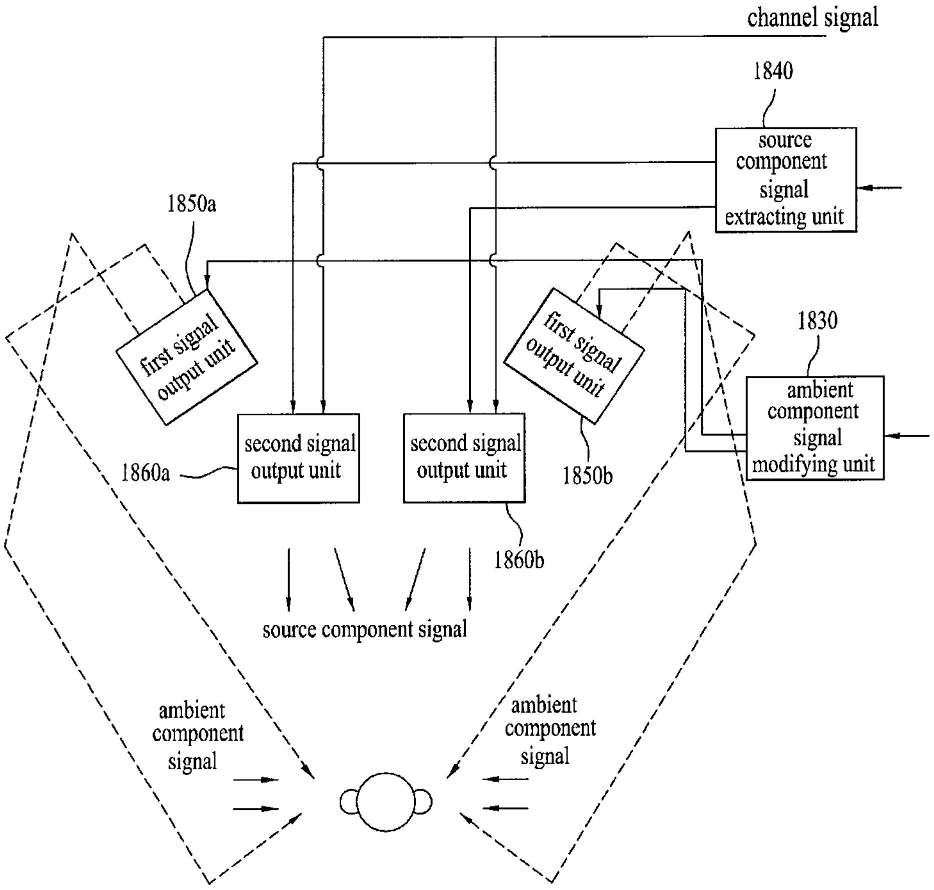
FIG. 18 and FIG. 19 are diagrams for a transfer path of an output signal of an apparatus for decoding an audio signal according to one embodiment of the present invention.
Figure 19:
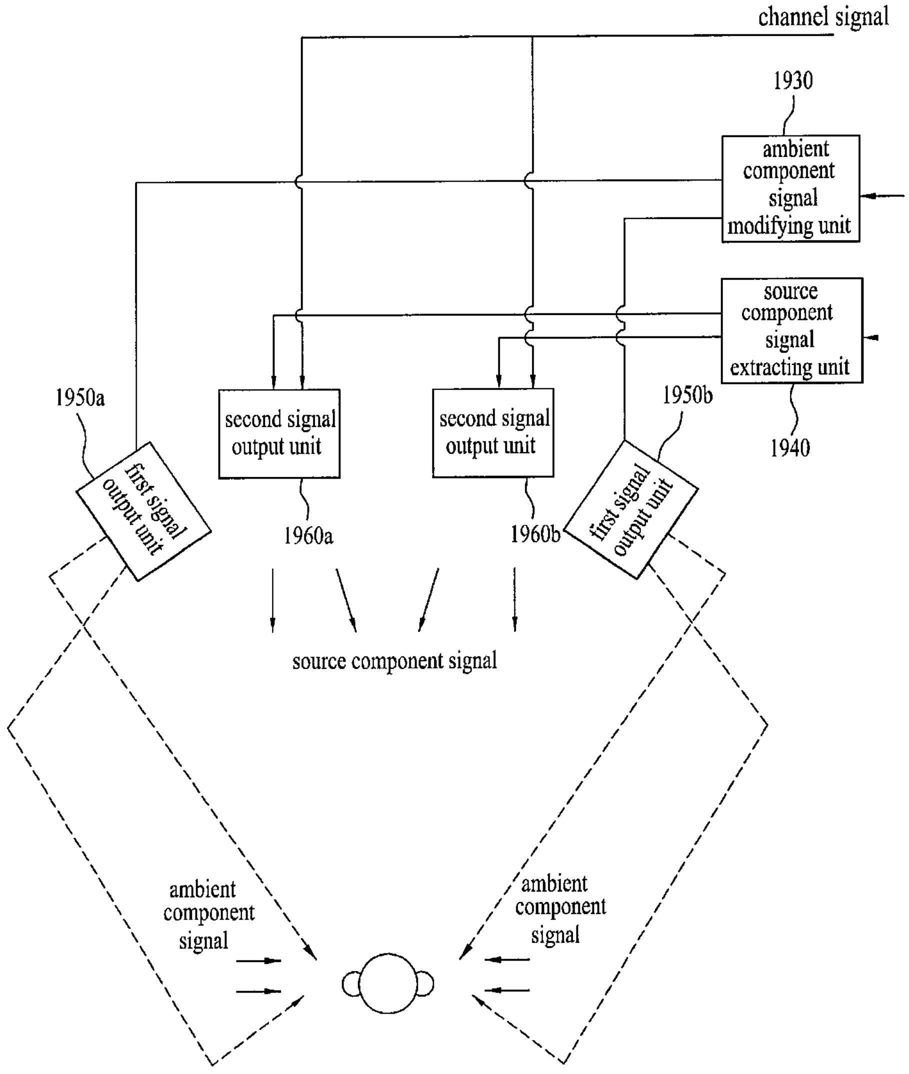

FIG. 18 and FIG. 19 schematically show an audio signal decoding apparatus, in which a first signal output unit for outputting an ambient component signal is disposed to have an output direction different from that of a second signal output unit for outputting an audio signal or a source component signal, and a method of reproducing an audio signal using the same. In FIG. 18 and FIG. 19, a channel signal is an example of an audio signal inputted to an audio signal receiving unit of the present invention, includes an ambient component signal and a source component signal, and indicates a signal outputted on each channel.

Referring to FIG. 18, first signal output units 1850*a* and 1850*b* have output directions toward lateral rear sides with reference to output directions of second signal output units 1860*a* and 1860*b*, respectively. Ambient component signals are inputted to the first signal output units 1850*a* and 1850*b* from a ambient component signal modifying unit 1830, respectively. Source component signals from a source component signal extracting unit 1840 or an audio signal from an audio signal receiving unit (not shown in the drawing) is inputted to the second signal output units 1860*a* and 1860*b*. The ambient component signal modifying unit 1830 and the source signal component extracting unit 1840 are equivalent to the former ambient component signal modifying unit 1130 and the former source component signal extracting unit 1140 shown in FIG. 11, of which details will be omitted in the following description.

As the first signal output unit 1850*a*/1850*b* has the output direction toward the lateral rear side, an ambient component signal outputted in the lateral rear direction can have an increased effect of being reflected by a wall of a rear or lateral side. Moreover, a path for delivering an ambient component signal to a listener can be provided in more various ways, whereby a stereo effect of the audio signal can be increased due to a natural delay effect and the like.

Referring to FIG. 19, first signal output units 1950*a* and 1950*b* have output directions toward lateral front sides with reference to the output directions of the first signal output units 1850*a* and 1850*b* shown in FIG. 18 and output directions of second signal output units 1960*a* and 1960*b*, respectively. Ambient component signals are inputted to the first signal output units 1950*a* and 1950*b* from a ambient component signal modifying unit 1930, respectively. Source component signals from a source component signal extracting unit 1940 or an audio signal from an audio signal receiving unit (not shown in the drawing) is inputted to the second signal output units 1960*a* and 1960*b*. Details of the ambient component signal modifying unit 1930 and the source signal component extracting unit 1940 will be omitted in the following description.

As the first signal output unit 1950*a*/1950*b* has the output direction toward the lateral front side, a ambient component signal outputted in the lateral front direction can have a further increased effect of being reflected by wall of a lateral side. Moreover, comparing to the former audio signal decoding apparatus shown in FIG. 18, since spaces required for the first signal output units 1950*a* and 1950*b* and the second signal output units 1960*a* and 1960*b* are narrow, the present invention is more useful for an audio signal decoding apparatus having a narrow space for an output unit.

Figure 20:
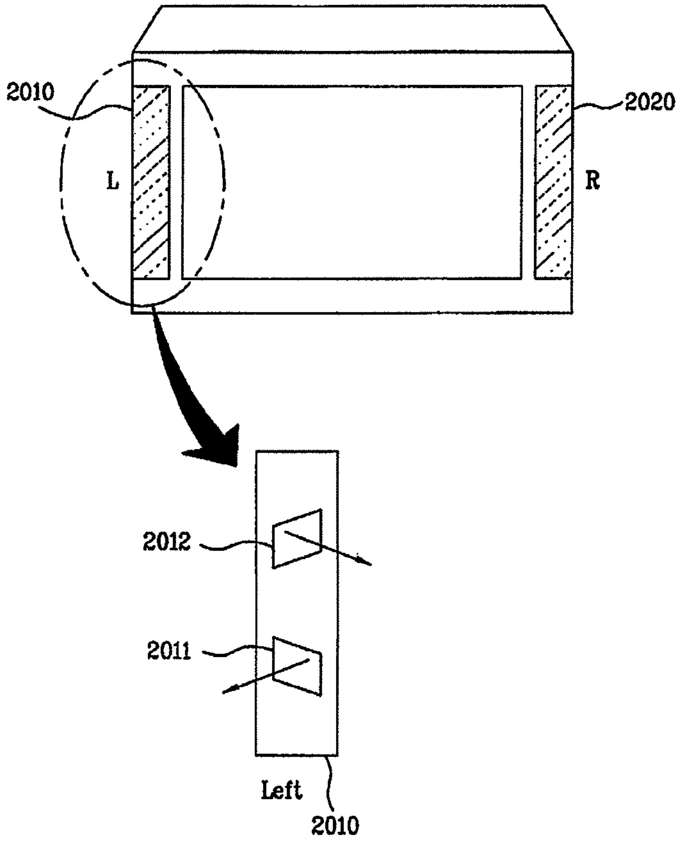
FIG. 20 is a schematic diagram of an apparatus for decoding an audio signal according to one embodiment of the present invention.

In an audio signal decoding apparatus according to the present invention, first and second signal output units for outputting an ambient component signal and a source component signal can consecutively configure a single output unit. FIG. 20 shows a TV including an audio signal decoding apparatus having the first and second signal output units configured in a single output unit. In this disclosure, the TV is taken as an example. Yet, it can be widely applicable to a device including an audio signal decoder.

Referring to FIG. 20, an output unit 2010 and 2020 includes two units L and R which are disposed in a vertical direction. The output unit 2010 and 2020 includes a first signal output unit for outputting a ambient component signal and a second signal output unit for outputting an audio signal or a source component signal. And, an enlarged internal diagram for the output unit 2101 located to the left of the screen part is shown in a bottom part of FIG. 20. The left output unit 2010 includes a first signal output unit 2011 and a second signal output unit 2012. And, it is able to dispose the first and second signal output units 2011 and 2012 to differ from each other in output direction. For instance, the output direction of the second signal output unit 2012 is disposed toward a front side, while the output direction of the first signal output unit 2011 is disposed toward a lateral rear side or a lateral front side.

Moreover, it is able to divert or shift the output directions of the first and second signal output units 2011 and 2012 based on characteristic information. The characteristic information can be determined according to characteristics of a sound source or an operation mode thereof. The characteristics or operation mode of the sound source can be included in a bitstream indicating an audio signal inputted to an audio signal decoding apparatus or can be stored in the ambient component signal modifying unit 1130 of the audio signal decoding apparatus according to the present invention. Moreover, the characteristics or operation mode of the sound source can be inputted via a listener input device (not shown in the drawing) by a listener.

For instance, in case that a listener attempts to reproduce a stereo signal having no surround effect only, the listener inputs a preset 2ch mode using a remote controller or the like. If so, the audio signal decoding apparatus receives it and is then able to divert a disposed direction of the first signal output unit 2011 so that the output direction of the first signal output unit 2011 is identical to that of the second signal output unit 2012. This diversion of the disposed direction can be obtained by the mechanical rotation or by a signal processing method.

Figure 21:
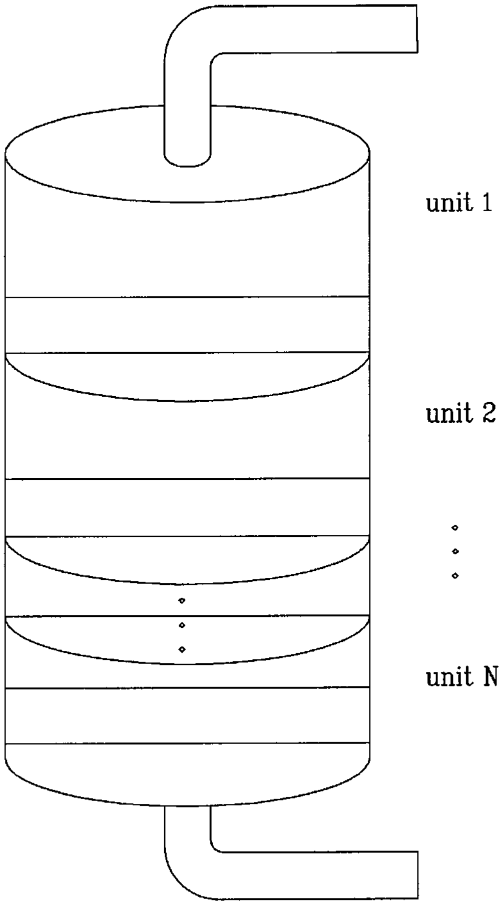
FIG. 21 is a diagram of an output unit according to one embodiment of the present invention.

According to another embodiment of the present invention, the output unit including the first and second signal output units can have various configurations. FIG. 21 shows an example the output unit. The output unit can include a plurality of units. And, each of a plurality of the units can include a first signal output unit or a second signal output unit. Referring to FIG. 21, an output unit having a cylindrical configuration is easily rotatable, increases a stereo effect by outputting a different signal to each partitioned area, and controls an output direction of each unit according to the characteristic information. The cylindrical configuration of the output unit does not limit examples of the present invention only if each example includes a plurality of units in a rotatable configuration.

In an audio signal decoding apparatus according to the present invention, a first signal output unit or a second signal output unit can include a plurality of units as well as an output unit. In this case, a plurality of the units can output signals of different frequency bands and an output direction of each of the units can be adjusted according to unit characteristic information. The unit characteristic information can be determined according to characteristics of a sound source. The characteristics of the sound source can be included in a bitstream indicating an audio signal inputted to an audio signal decoding apparatus or can be stored in the ambient component signal modifying unit 1130 of the audio signal decoding apparatus according to the present invention. Moreover, the characteristics of the sound source can be inputted via a listener input device (not shown in the drawing) by a listener.

Figure 22:
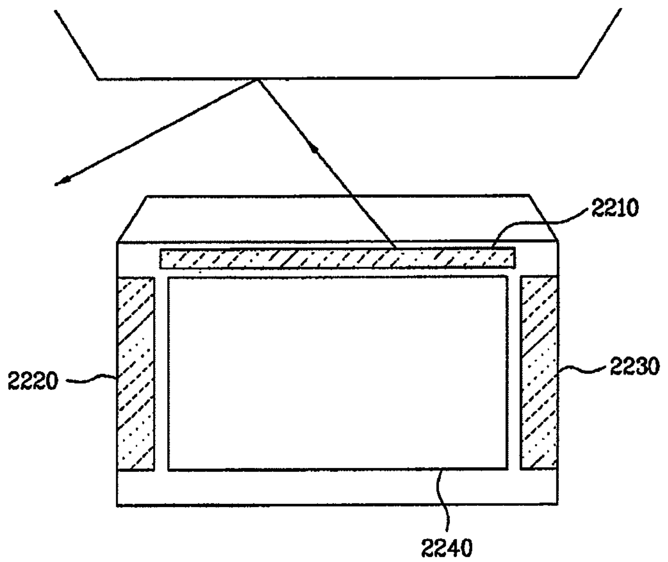
FIG. 22 is a schematic diagram of an apparatus for decoding an audio signal according to one embodiment of the present invention.

According to a further embodiment of the present invention, it is able to enhance a stereo effect of an audio signal in a manner of disposing a first signal output unit for outputting an ambient component signal over the screen part. FIG. 22 shows a TV as an example of an audio signal decoding apparatus having first and second signal output units disposed vertical to each other in a front side where the screen part is located, in which the first signal output unit is disposed over the screen part. Referring to FIG. 22, an output unit includes a first signal output unit 2210 for outputting a ambient component signal and second signal output units 2220 and 2230 for outputting source component signals. And, the second signal output units can be located to the left and right sides of a screen part 2240. The first signal output unit 2210 is located in the same plane of the second signal output units 2220 and 2230 and the screen part 2240 and can be disposed over the screen part 2240 to be vertical to the second signal output units 2220 and 2230.

Referring to FIG. 22, when the first signal output unit 2210 of the TV is disposed over the screen part 2240 to be vertical to the second signal output units 2220 and 2230, a ambient component signal is outputted from the first signal output unit 2210 and is then reflected using a ceiling. Thus, comparing to the case that the first signal output unit is located in lateral rear or front of the second signal output unit, the case that the first signal output unit 2210 is located at the top further includes the step of reflection due to collision with the ceiling, whereby a stereo effect of an audio signal can be further enhanced. Moreover, the first signal output unit 2210 is not only located over the screen part 2240 to be vertical to the second signal output units 2220 and 2230 but also disposed over the screen part 2240 by configuring various angles.

In FIG. 22, shown is the case that the first signal output unit 2210 is located over the screen part 2240. The first signal output unit 2210 can be located over the audio decoding apparatus to be vertical to the front side including the screen part and the second signal output unit or can be located over a backside opposing the front side. And, the first signal output unit can be disposed to form a specific angle with a plane using a physical or electrical method.

According to a further embodiment of the present invention, proposed is a decoding apparatus and method for enhancing a stereo effect of an audio signal in a manner of re-modifying an ambient component signal by considering an environment where an audio signal decoding apparatus is used. This is explained in detail with reference to FIG. 23 as follows.

Figure 23:
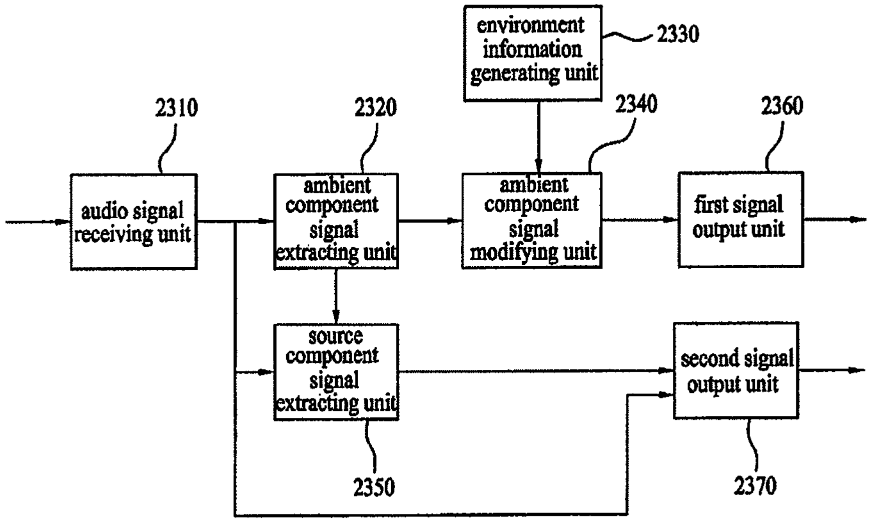
FIGS. 23 to 25 are schematic block diagrams of an apparatus for decoding an audio signal according to one embodiment of the present invention.

Referring to FIG. 23, an apparatus for decoding an audio signal according to the present invention mainly includes an audio signal extracting unit 2310, an ambient component signal extracting unit 2320, an environment information generating unit 2330, an ambient component signal modifying unit 2340, a source component signal extracting unit 2350, a first signal output unit 2360 and a second signal output unit 2370. The audio signal extracting unit 2310, the ambient component signal extracting unit 2320, the source component signal extracting unit 2350, the first signal output unit 2360 and the second signal output unit 2370 have the same functions and roles of the audio signal extracting unit 1110, the ambient component signal extracting unit 1120, the source component signal extracting unit 1140, the first signal output unit 1650 and the second signal output unit 1660 shown in FIG. 11 or FIG. 16. And, their details will be omitted in the following description. The audio signal decoding apparatus further includes a source component signal modifying unit (not shown in the drawing) for modifying an extracted source component signal, whereby a stereo effect of an audio signal can be enhanced.

The environment information generating unit 2330 transfers various preset modes to a listener input device (not shown in the drawing) and is then able to output preset environment information corresponding to a mode selected by a listener. As an example of the preset mode, there exists a wall-mounted mode or a stand mode in case of TV. The environment information generating unit 2330 outputs the environment information corresponding to the wall-mounted mode or the stand mode to the ambient information signal modifying unit 2340. The environment information corresponding to the wall-mounted mode may be set to a narrower distance between an audio signal decoding apparatus and a reflecting plane rather than the stand mode. Meanwhile, a listener is able to directly input environment information to the environment information generating unit 2330. For instance, a listener is able to input a distance between a backside of the audio signal decoding apparatus and a reflecting plane, a distance between a topside of the apparatus and a ceiling, a distance between a lateral side of the apparatus and a reflecting plane and the like using an input device. And, the environment information generating unit 2330 is then able to generate the environment information.

Moreover, the environment information can include information on ambient characteristics between the audio signal decoding apparatus and a listening position. For instance, the information on the ambient characteristic can include a distance between the decoding apparatus and the listening position. An optimal listening position for maximizing a stereo effect of an audio signal can be varied by the distance between the audio signal decoding apparatus and the listening position. Hence, the environment information generating unit 2330 receives the distance via the listener input device, generates the environment information and is then able to output the generated environment information to the ambient component signal modifying unit 2340. Moreover, the environment information generating unit 2330 is able to estimate a position of a listener using a separate detecting device (not shown in the drawing). For instance, the environment information generating unit 2330 is able to estimate a distance between the audio signal decoding apparatus and a listener using such a separate sound sensor as a microphone, a remote controller or the like.

An audio signal decoding apparatus and method according to the present invention can further enhance a stereo effect of an audio signal in a manner of modifying an ambient component signal based on the above-generated environment information.

Figure 24:
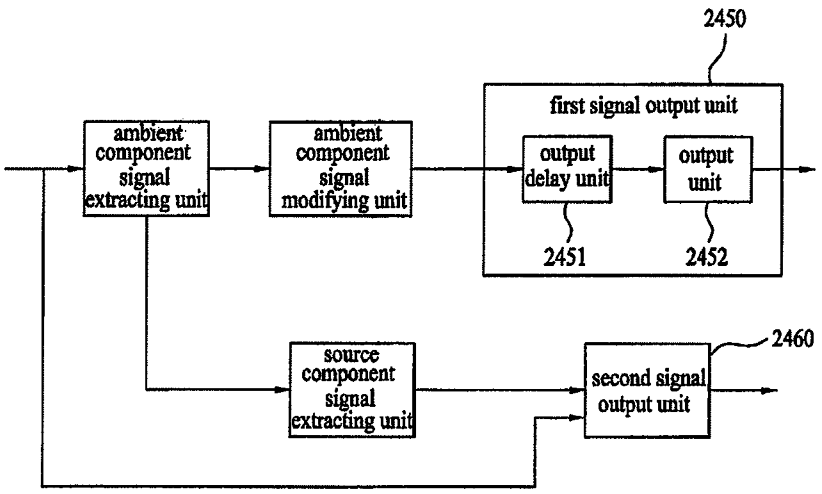

According to a further embodiment of the present invention, by outputting an ambient component signal to be more delayed than a source component signal or by giving an extension effect to a source component signal, it is able to enhance a stereo effect of an audio signal. FIG. 24 is a schematic diagram of an audio signal decoding apparatus further including an output delaying unit 2451. Referring to FIG. 24, a first signal output unit 2450 for outputting an ambient component signal includes an output delaying unit 2451 and an output unit 2452 and is able to output an ambient component signal at a time delayed more than a source component signal outputted by a second signal output unit 2460. Hence, an effect of giving a stereo effect can be obtained by maximizing a reverberant effect of an audio signal.

Figure 25:
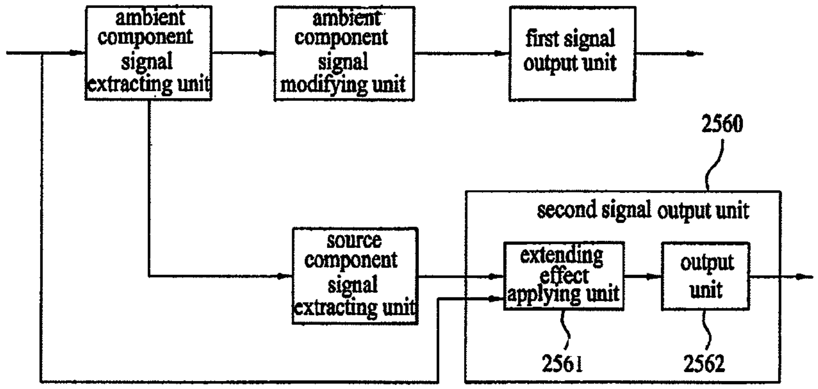

FIG. 25 is a schematic diagram of an audio signal decoding apparatus further including an extension effect applying unit 2561. Referring to FIG. 25, a second signal output unit 2560 for outputting a source component signal includes an extension effect applying unit 2561 and an output unit 2562. The extension effect applying unit 2561 brings an effect of extending a distance of each source component signal outputted from the second signal output unit 2560, whereby an audio signal can be listened to in a wider space.

Moreover, an audio signal decoding apparatus according to the present invention includes both an output delaying unit within a first signal output unit and an extension effect applying unit within a second signal output unit, thereby enhancing a stereo effect of an audio signal.

According to the present invention, the above-described decoding/encoding method can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, a bitstream generated by the encoding method is stored in a computer-readable recording medium or can be transmitted via wire/wireless communication network.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, the present invention is applicable to encoding and decoding of an audio signal.

The invention claimed is:

1. A method of decoding an audio signal, comprising:

receiving by a device an input audio signal having a plurality of channel signals, each of the plurality of channel signals including an ambient component signal and a source component signal;

extracting by the device the ambient component signal and the source component signal of each of the plurality of channel signals based on a correlation between the plurality of channel signals;

modifying by the device the ambient component signal using surround effect information; and generating by the device the audio signal including a plurality of channels using the modified ambient component signal and the source component signal, wherein the source component signal is obtained by eliminating the extracted ambient component signal from the input audio signal.

2. The method of claim 1, wherein the correlation is estimated for each predetermined time and each predetermined frequency band of the plurality of channel signals.

3. The method of claim 1, wherein the ambient component signal has low correlation between component signals included in each of the plurality of channel signals.

4. The method of claim 1, wherein the surround effect information is level information applied to the ambient component signal.

5. The method of claim 1, wherein the surround effect information is a time delay, filter information or phase information applied to the ambient component signal.

6. The method of claim 1, wherein the input audio signal is received via a broadcast signal.

7. The method of claim 1, wherein the input audio signal is received via a digital medium.

8. A non-transitory computer-readable recording medium comprising a program recorded therein to perform the steps of claim 1.

9. An apparatus for decoding an audio signal, comprising:

an audio signal receiving device configured to receive an input audio signal having a plurality of channel signals, each of the plurality of channel signals including an ambient component signal and a source component signal;

an ambient component signal extracting device configured to extract the ambient component signal of each of the plurality of channel signals based on a correlation between the plurality of channel signals;

an ambient component signal modifying device configured to modify the ambient component signal using surround effect information;

a source component signal extracting device configured to extract the source component signal by eliminating the extracted ambient component signal from a signal inputted to the audio signal receiving device; and a signal output device configured to output the ambient component signal and the source component signal.

10. The apparatus of claim 9, wherein the ambient component signal extracting device is further configured to extract the ambient component signal based on a correlation estimated for each predetermined time and each predetermined frequency band of the plurality of channel signals.

11. The apparatus of claim 9, wherein the surround effect information comprises at least one of level information, a time delay, and filter information or phase information.

* * * * *

UNITED STATES PATENT AND TRADEMARK OFFICE

CERTIFICATE OF CORRECTION

PATENT NO. : 8,532,306 B2
APPLICATION NO. : 12/676848
DATED : September 10, 2013
INVENTOR(S) : Oh et al.

It is certified that error appears in the above-identified patent and that said Letters Patent is hereby corrected as shown below:

ON THE TITLE PAGE:

Item [75], Inventors, Delete "Hyon-O Oh, Seoul (KR)" and insert --Hyen-O Oh, Seoul (KR)--.

Signed and Sealed this
Nineteenth Day of November, 2013

Teresa Stanek Rea
*Deputy Director of the United States Patent and Trademark Office*